(12) United States Patent
Tani

(10) Patent No.: US 9,705,339 B2
(45) Date of Patent: Jul. 11, 2017

(54) METHOD AND SYSTEM FOR WIRELESS POWER SUPPLY

(71) Applicant: Panasonic Intellectual Property Management Co., Ltd., Osaka (JP)

(72) Inventor: Hiroyuki Tani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 340 days.

(21) Appl. No.: 14/685,321

(22) Filed: Apr. 13, 2015

(65) Prior Publication Data

US 2015/0311726 A1 Oct. 29, 2015

(30) Foreign Application Priority Data

Apr. 23, 2014 (JP) ................... 2014-089172

(51) Int. Cl.
| | |
|---|---|
| *H02J 5/00* | (2016.01) |
| *H02J 17/00* | (2006.01) |
| *H04B 5/00* | (2006.01) |
| *G01S 13/88* | (2006.01) |

(52) U.S. Cl.
CPC ............. *H02J 5/005* (2013.01); *H02J 17/00* (2013.01); *H04B 5/0037* (2013.01); *G01S 13/88* (2013.01); *H04B 5/0075* (2013.01)

(58) Field of Classification Search
CPC ........ H02J 5/005; H02J 17/00; H04B 5/0037; H04B 5/0075; G01S 13/88
USPC ........................................................ 307/104
See application file for complete search history.

(56) References Cited

U.S. PATENT DOCUMENTS

| | | |
|---|---|---|
| 3,795,910 A | 3/1974 | Robinson, Jr. |
| 4,187,506 A | 2/1980 | Frosch et al. |
| 5,579,010 A | 11/1996 | Iihoshi et al. |
| 6,114,834 A | 9/2000 | Parise |
| 2002/0029797 A1 | 3/2002 | Mikami et al. |
| 2010/0012819 A1 | 1/2010 | Graham |
| 2012/0126631 A1 | 5/2012 | Amma et al. |
| 2014/0021907 A1* | 1/2014 | Yu ........................ H02J 7/025 320/108 |

(Continued)

FOREIGN PATENT DOCUMENTS

| | | |
|---|---|---|
| DE | 601 04 063 | 8/2005 |
| DE | 10 2012 111 978 | 3/2014 |

(Continued)

OTHER PUBLICATIONS

Extended European Search Report issued Aug. 19, 2015 in corresponding European patent application No. 15 15 8593.

*Primary Examiner* — Rexford Barnie
*Assistant Examiner* — Toan Vu
(74) *Attorney, Agent, or Firm* — Wenderoth, Lind & Ponack, L.L.P.

(57) ABSTRACT

In a method and system for wireless power supply, the misalignment between the power transmission antenna and the power reception antenna is detected based on the electric power of an electromagnetic wave radiated from the position-detection power transmission antennas of the power transmission antenna, reflected by a reflector provided outside the power reception surface of the power reception antenna, and detected by the position-detection power reception antennas of the power transmission antenna.

10 Claims, 9 Drawing Sheets

(56) References Cited

U.S. PATENT DOCUMENTS

2014/0084863 A1\* 3/2014 Nakamura .............. H02J 5/005
 320/108
2014/0252866 A1 9/2014 Walsh et al.

FOREIGN PATENT DOCUMENTS

| EP | 0 325 034 | 7/1989 |
| JP | 2004-088443 | 3/2004 |
| JP | 2008-054422 | 3/2008 |
| JP | 2008-092703 | 4/2008 |
| JP | 2009-178001 | 8/2009 |
| JP | 2010-510766 | 4/2010 |
| JP | 2011-010472 | 1/2011 |
| JP | 2013-236524 | 11/2013 |
| WO | 2006/127562 | 11/2006 |

\* cited by examiner

METHOD AND SYSTEM FOR WIRELESS POWER SUPPLY

BACKGROUND OF THE INVENTION

1. Field of the Invention

The present invention relates to a method and system for wireless power supply in which electric power is transmitted and received wirelessly using electromagnetic waves (microwaves).

2. Description of the Related Art

Technologies for supplying electric power wirelessly using electromagnetic waves have been developed rapidly. One such technology is a system that performs magnetic coupling or magnetic resonance at a short distance of several meters or less to generate electromagnetic induction or magnetic resonance, using microwaves in the frequency range of several hundreds of kilohertz to several megahertz.

There is also a system for wireless power transmission using electromagnetic waves in which electric power is transmitted from a power transmission apparatus to a movable power reception apparatus that is located far from the power transmission apparatus. Microwaves in the range of several hundreds of megahertz to several gigahertz can be transmitted to faraway power reception apparatuses. Examples of such systems for wireless power transmission include a space solar power system in which an artificial satellite with solar panels is launched to an altitude above the equator for transmitting solar photovoltaic power to ground-based power reception apparatuses; a system for transmitting power to power reception apparatuses located on an isolated island, and a system for supplying power to mobile objects such as electric vehicles (EVs).

Such systems for wireless power transmission using electromagnetic waves (microwaves) have a higher degree of freedom than other systems in the distance over which a power transmission antenna transmits electric power. For this reason, these systems have been proposed to supply and charge electric power to mobile objects such as electric vehicles and robots.

These systems for power transmission, however, undesirably degrade their power supply efficiency due to misalignment in the position of power supply. Another problem with these systems is the lack of safety of electromagnetic waves leaking outside and their influence on other devices (EMI: Electro-Magnetic Interference) due to the use of high microwave frequencies. To achieve accurate positioning by overcoming the former problem, the following approaches have been proposed. Japanese Unexamined Patent Publication No. 2013-236524 discloses that the position of a mobile object on the power reception side is recognized and the mobile object is guided to the position of power supply by the power transmission side. Meanwhile, Japanese Unexamined Patent Publication No. 2008-92703 discloses that a device on the power transmission side is mechanically controlled to be aligned with a power reception antenna and to achieve power transmission.

FIG. 9 shows a configuration example of a conventional system for power transmission. Microwave generator 101 supplies microwave power to power transmission antenna 103 through microwave transmission line 102. Microwave transmission line 102 includes a distributor, and in some cases, an amplifier. Power transmission antenna 103 has a power transmission surface large enough to cover the movable range (the misalignment range) of power reception antenna 105. The power transmission surface of power transmission antenna 103 has opening 104 corresponding only to the power reception surface of power reception antenna 105. An electromagnetic wave is radiated only through opening 104 to achieve efficient microwave power transmission. Power reception antenna 105 receives the electromagnetic wave, which is converted into appropriate power by power conversion circuit 106 and then supplied to power supply object 107.

Examples of proposed methods for recognizing the switching position of the opening of a power transmission antenna are as follows. In one example, the position of the opening of the power transmission antenna is controlled by recognizing the position of the power reception antenna by a mechanical operation of a magnet. In another example, antenna elements used for power transmission are electrically switched by recognizing the position of the power reception antenna by using a separate component.

SUMMARY OF THE INVENTION

The present invention provides a method and system for wireless power supply which cause no such problems as efficiency degradation due to misalignment or electromagnetic wave leakage and perform wireless power supply by using components of the power transmission antenna and the power reception antenna, without using a separate component dedicated to recognizing the position of a mobile object.

The method for wireless power supply according to an aspect of the present invention is a method in which power is supplied wirelessly from a power transmission antenna to a power reception antenna, each of the antennas including a plurality of antenna elements. The power transmission surface of the power transmission antenna and the power reception surface of the power reception antenna are parallel and opposite to each other, and a reflector is provided outside the power reception surface and inwardly inclined at a predetermined angle with respect to the power reception surface. According to the method for wireless power supply according to the aspect of the present invention, a misalignment correction operation prior to a wireless power supply operation is performed as follows.

Among the plurality of antenna elements, at least two antenna elements disposed at the periphery of the power transmission surface of the power transmission antenna are allowed to function as position-detection power transmission antennas, and antenna elements disposed inside the position-detection power transmission antennas on the power transmission surface are allowed to function as position-detection power reception antennas. An electromagnetic wave is radiated from the position-detection power transmission antennas to the power reception antenna. Then, the electric power of the electromagnetic wave reflected by the reflector and then received by the position-detection power reception antennas is calculated. The positional relation between the power transmission antenna and the power reception antenna is detected based on the calculated electric power. The relative position between the power transmission antenna and the power reception antenna is corrected based on the detected positional relation.

The system for wireless power supply according to the aspect of the present invention is a system in which power is supplied wirelessly from a power transmission apparatus to a power reception apparatus. The power transmission apparatus includes a microwave generator configured to generate an electromagnetic wave; a control unit configured to control the microwave generator; and a power transmission antenna having a power transmission surface including a plurality of antenna elements. The power reception apparatus, on the other hand, includes a power reception antenna, a reflector, and a power conversion circuit. The power reception antenna has a power reception surface including a plurality of antenna elements. The power reception surface is parallel and opposite to the power transmission surface. The reflector is provided outside the power reception surface and has a reflective surface inclined at a predetermined angle with respect to the power reception surface so as to face inward. The power conversion circuit converts the power received by the power reception antenna into power to be supplied to a power supply object. In the misalignment correction operation performed before the wireless power supply operation, at least two of the plurality of antenna elements disposed at the periphery of the power transmission surface of the power transmission antenna function as position-detection power transmission antennas, and antenna elements disposed inside the position-detection power transmission antennas on the power transmission surface function as position-detection power reception antennas. The control unit detects the positional relation between the power transmission antenna and the power reception antenna based on the electric power of an electromagnetic wave radiated from the position-detection power transmission antennas, reflected by the reflector, and received by the position-detection power reception antennas.

According to the method and system for wireless power supply according to the present invention, the positional relation between the power transmission antenna and the power reception antenna is recognized and the misalignment is corrected by using the power transmission antenna and the power reception antenna. This achieves efficient and safe wireless power supply with little leakage of electromagnetic wave.

DETAILED DESCRIPTION OF THE PREFERRED EMBODIMENT

Prior to describing the exemplary embodiment of the present invention, problems of conventional systems for power transmission will now be described as follows. The conventional systems for power transmission require a component to recognize the target position to which power is transmitted and also requires a power transmission antenna large enough to cover the misalignment of the power reception antenna. Thus, the conventional systems for power transmission are not practical because they need a large complex component dedicated to position recognition, besides components to perform the basic function of transmitting and receiving power.

The method and system for wireless power supply according to the exemplary embodiment of the present invention will now be described with reference to the attached drawings.

Figure 1:
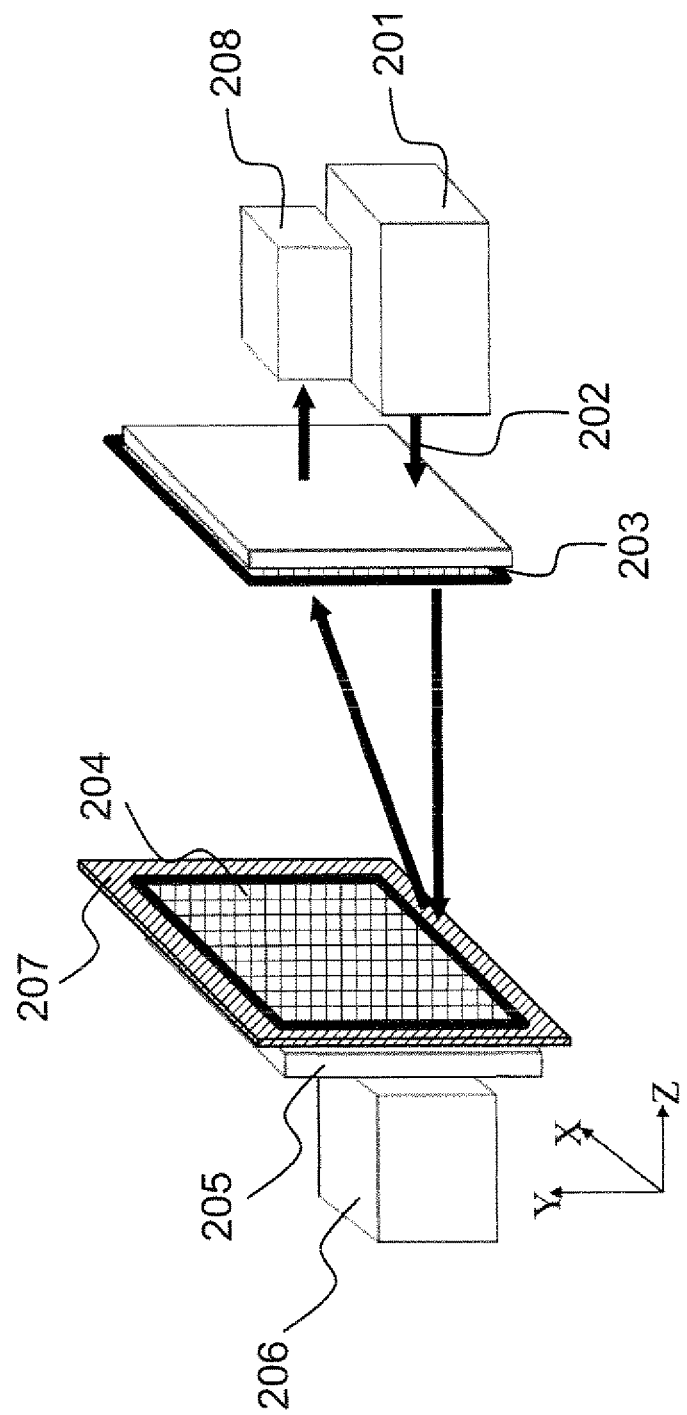
FIG. 1 shows a basic structure of a system for wireless power supply according to an exemplary embodiment of the present invention.

FIG. 1 shows the basic structure of the system for wireless power supply according to the exemplary embodiment of the present invention. Microwave generator 201, which generates an electromagnetic wave (microwave), supplies power to power transmission antenna 203 including a plurality of antenna elements (power transmission antenna elements) through microwave transmission line 202. Microwave transmission line 202 includes a distributor, and in some cases, an amplifier. Power transmission antenna 203 has a power transmission surface, and power reception antenna 204 has a power reception surface. The power transmission surface is parallel and opposite to the power reception surface and radiates a microwave to the power reception surface. The power transmission surface and the power reception surface are substantially identical in shape and size. Power reception antenna 204 receives the microwave, which is converted into appropriate power (DC power) by power conversion circuit 205 and then supplied to power supply object 206.

The system for wireless power supply according to the exemplary embodiment includes a power transmission apparatus including power transmission antenna 203 and a power reception apparatus including power reception antenna 204. The power transmission apparatus includes microwave generator 201 for generating a microwave, control unit 208 for controlling microwave generator 201, and power transmission antenna 203. The power reception apparatus includes power reception antenna 204, reflector 207, and power conversion circuit 205. Power reception antenna 204 is parallel and opposite to the power transmission surface of power transmission antenna 203. Reflector 207 is provided outside the power reception surface of power reception antenna 204 and has a reflective surface inclined at a predetermined angle with respect to the power reception surface so as to face inward. Power conversion circuit 205 converts the power received by power reception antenna 204 into power to be supplied to power supply object 206.

In the system for wireless power supply according to the exemplary embodiment, before supplying power to power supply object 206, a misalignment correction operation is performed using the wave reflected by reflector 207, which is provided around the periphery of the power reception surface of power reception antenna 204. In the misalignment correction operation, specific ones (at least two) of the antenna elements of power transmission antenna 203 are used as position-detection power transmission antennas. Each of the position-detection power transmission antennas radiates an electromagnetic wave (microwave), which is then reflected by reflector 207 provided on power reception antenna 204 that is misaligned. The reflected wave is received by the position-detection power reception antennas, which have the function of receiving power, of power transmission antenna 203. In the method and system for wireless power supply according to the exemplary embodiment, when the position-detection power reception antennas of power transmission antenna 203 receive the reflected wave, the power of the reflected wave is converted by control unit 208. The amount of the converted power is used to detect a degree of the misalignment between the power transmission surface of power transmission antenna 203 and the power reception surface of power reception antenna 204.

In this misalignment correction operation, of all the antenna elements of power transmission antenna 203, the position-detection power reception antennas used for power reception have been switched from antenna elements used for power transmission. The microwave received by the position-detection power reception antennas of power transmission antenna 203 are converted to power by control unit 208. Control unit 208 detects the intensity of the reflected wave from the amount of the converted power. Control unit 208 then detects, from the intensity of the reflected wave, the positional relation (misalignment) between the power transmission surface of power transmission antenna 203 and the power reception surface of power reception antenna 204. On the basis of the information about the detected positional relation, at least one of power transmission antenna 203 and power reception antenna 204 is moved so that the power transmission surface and the power reception surface can face each other properly. In order to place the power transmission surface and the power reception surface in appropriate positions, a means for moving power transmission antenna 203 and/or power reception antenna 204 may be used to automatically drive the power transmission apparatus including power transmission antenna 203 and/or the power reception apparatus including power reception antenna 204 based on the information about the detected positional relation.

Figure 2:
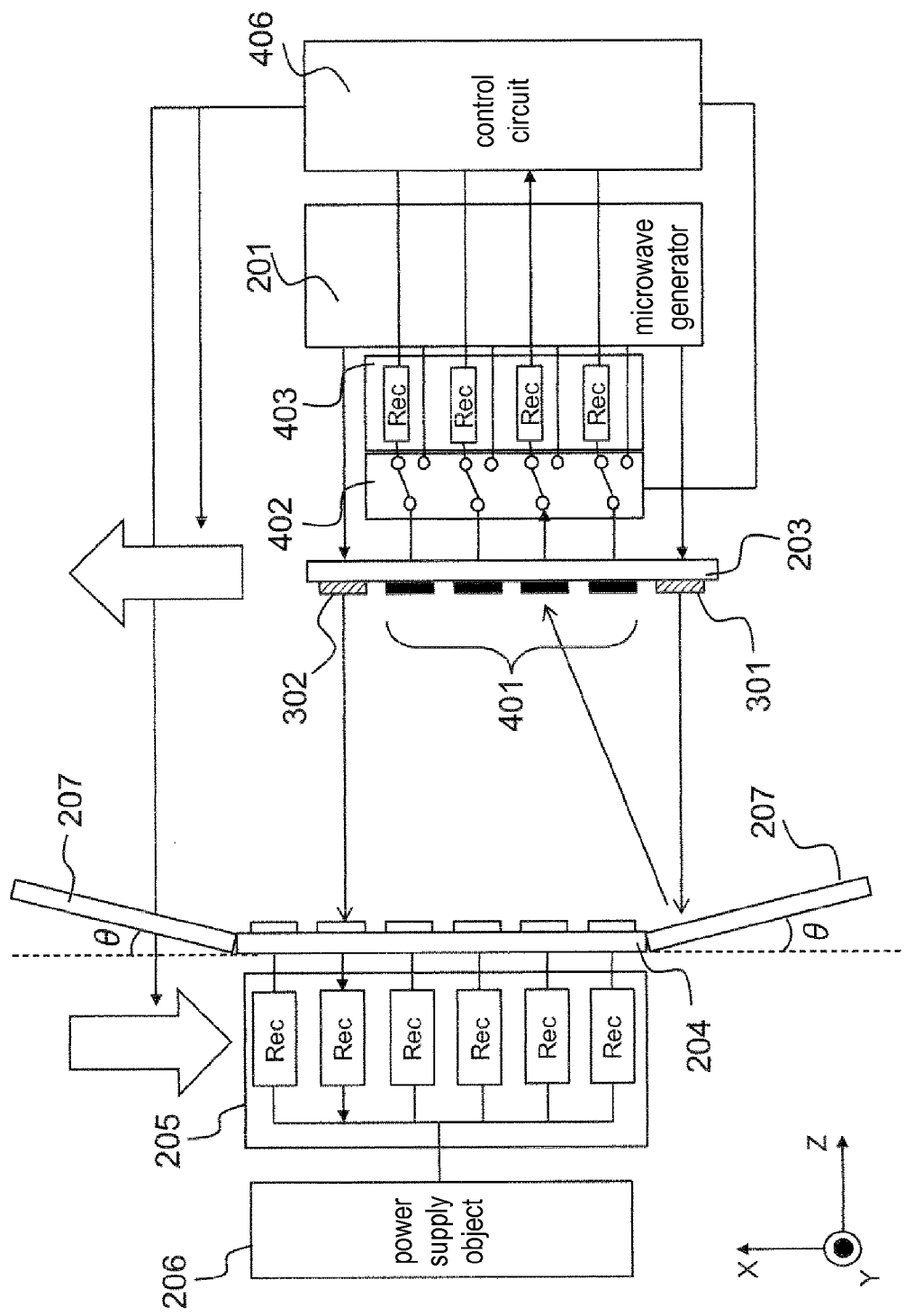
FIG. 2 is a diagram in which the system for wireless power supply according to the exemplary embodiment of the present invention has misalignment.
Figure 3:
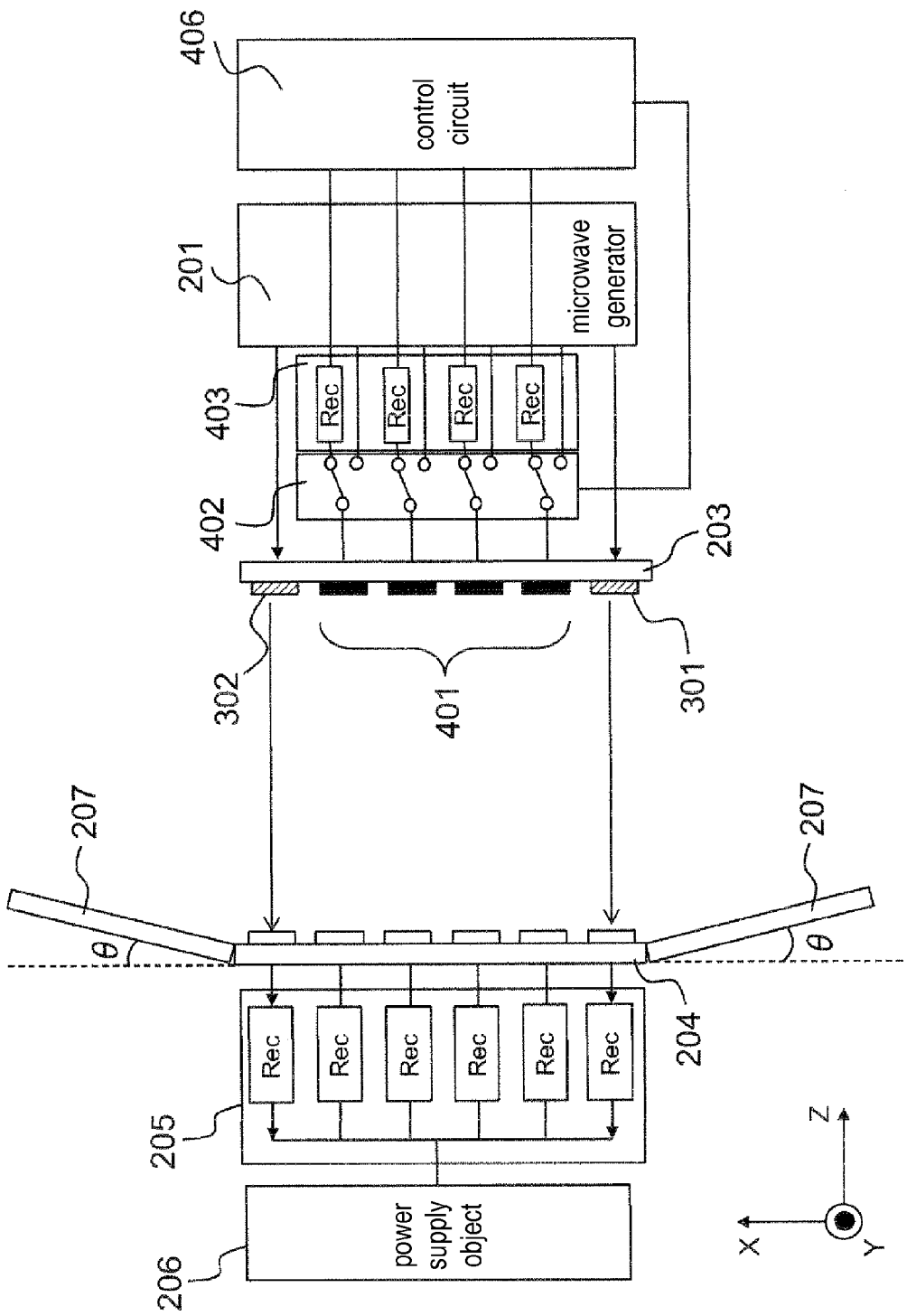
FIG. 3 is a diagram in which the system for wireless power supply according to the exemplary embodiment of the present invention has been made through a position correction.
Figure 4:
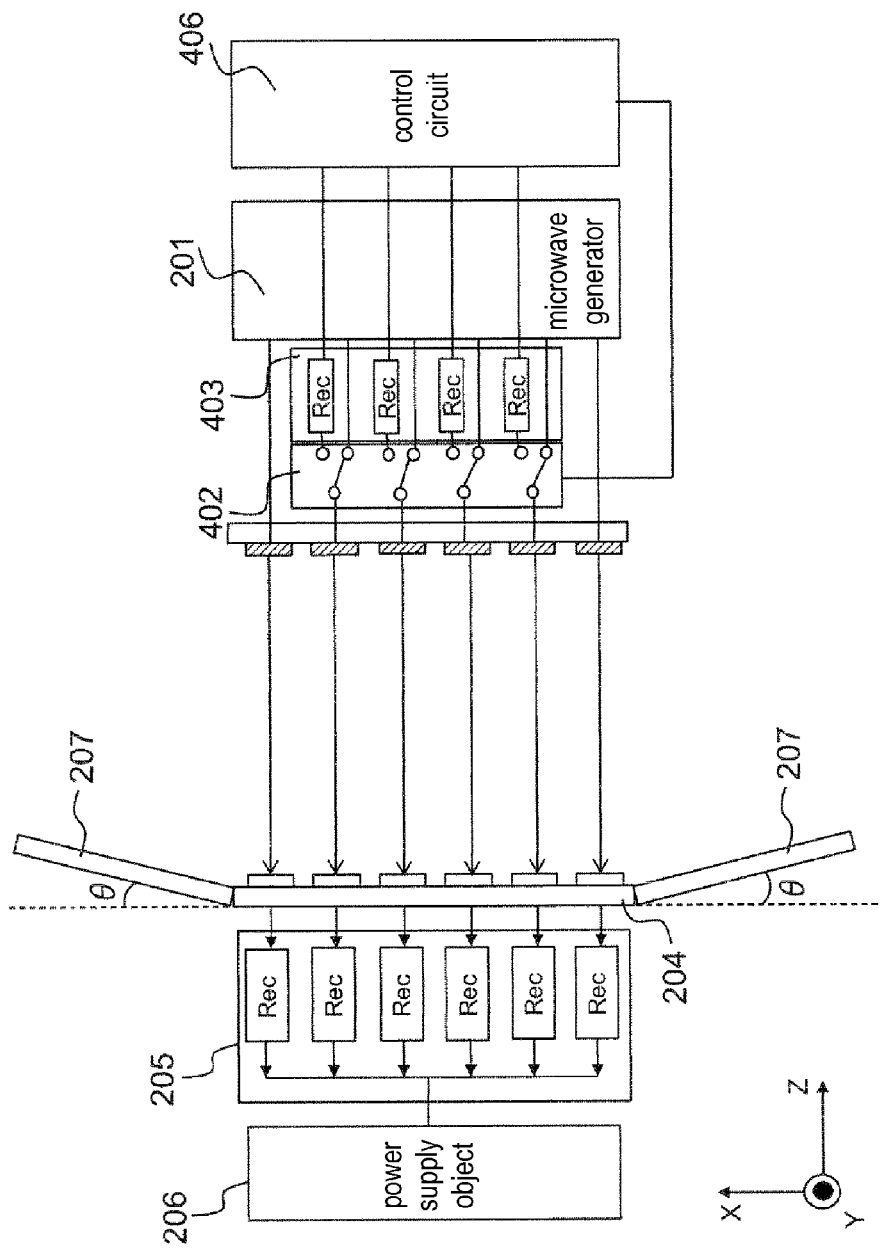
FIG. 4 is a diagram in which the system for wireless power supply according to the exemplary embodiment of the present invention is performing wireless power supply.

The detection of misalignment, if any, between power transmission antenna 203 and power reception antenna 204 will now be described as follows with reference to FIGS. 2, 3, and 4. Each of FIGS. 2, 3, and 4 shows a Z-X plane in which there is misalignment in the X-axis direction (in the up and down direction of each drawing). If there is misalignment in the Y-axis direction, misalignment in the Y-Z plane can be detected in the same manner as the misalignment in the X-axis direction, which will now be described below.

As shown in FIG. 2, control unit 208 (see FIG. 1) of the power transmission apparatus in the system for wireless power supply according to the exemplary embodiment includes antenna switch 402, power reception circuit 403, and control circuit 406. Antenna switch 402 allows some (at least two) of the antenna elements of power transmission antenna 203 to function as position-detection power reception antennas 401. Power reception circuit 403 converts the power received by position-detection power reception antennas 401 that have been switched by antenna switch 402 into power required to detect misalignment. Control circuit 406 controls antenna switch 402.

The following is a description of the reflected-wave detection operation, which is a part of the misalignment correction operation. FIG. 2 is a diagram in which power transmission antenna 203 is misaligned in the −X-axis direction (in the down direction of FIG. 2) with respect to power reception antenna 204. In FIG. 2, specific antenna elements of power transmission antenna 203 are used as position-detection power transmission antennas. The specific antenna elements are first power transmission antenna element 301 and second power transmission antenna element 302, which are disposed at both ends of the power transmission surface including the plurality of power transmission antenna elements. Each of first power transmission antenna element 301 and second transmission antenna element 302 radiate power supplied from microwave generator 201 to power reception antenna 204 as an electromagnetic wave (microwave).

In the state shown in FIG. 2, when a microwave is radiated from first power transmission antenna element 301, which is one of the position-detection power transmission antennas, the radiated microwave is reflected by reflector 207 present in front of first power transmission antenna element 301. Reflector 207 is disposed at an angle θ of more than 0° and less than 45° with respect to the power reception surface of power reception antenna 204. As a result, the electromagnetic wave reflected by reflector 207 is reflected toward the inside of power transmission antenna 203 and received by position-detection power reception antennas 401 including the plurality of antenna elements disposed on the inner side of the power transmission surface of power transmission antenna 203. In this case, each antenna element of position-detection power reception antennas 401 is separated from a power transmission path connected to microwave generator 201 and is connected to power reception circuit 403 via antenna switch 402. Thus, the microwave received by position-detection power reception antennas 401 is converted into DC power by power reception circuit 403 and is input to control circuit 406. The converted DC power is detected by control circuit 406. If the detected DC power is high, control circuit 406 detects misalignment under the recognition that the microwave from first power transmission antenna element 301 is reflected by reflector 207 and then received.

On the other hand, in the state shown in FIG. 2, when a microwave is radiated from second power transmission antenna element 302, which is the other of the position-detection power transmission antennas, second power transmission antenna element 302 radiates a strong microwave in the front direction. The strong microwave does not enter reflector 207 but is received by the power reception antenna elements on the power reception surface of power reception antenna 204. As a result, the electric power received by position-detection power reception antennas 401 is small, allowing control circuit 406 to detect that power transmission antenna 203 is not misaligned in the +X-axis direction.

As described above, control circuit 406 of the power transmission apparatus of the system for wireless power supply according to the exemplary embodiment allows first and second power transmission antenna elements 301 and 302, which are parts of the antenna elements of power transmission antenna 203, to function as position-detection power transmission antennas in the misalignment correction operation performed before the wireless power supply operation. Then, control circuit 406 detects the positional relation (misalignment) between the power transmission surface of power transmission antenna 203 and the power reception surface of power reception antenna 204 based on the electric power of electromagnetic wave (microwave) that is radiated from these position-detection power transmission antennas, reflected by reflector 207, and received by position-detection power reception antennas 401.

As described above, in the power transmission apparatus, the reflected-wave detection operation is performed as a part of the misalignment correction operation to recognize the presence or absence of misalignment and the direction of misalignment, if any. Control unit 208 may correct the position of power transmission antenna 203 based on the recognized information. Alternatively, control unit 208 may transmit the information about the misalignment to power reception antenna 204, more specifically, to power supply object 206 so that the power reception apparatus can perform a misalignment correction operation.

At least one of the power transmission apparatus and the power reception apparatus performs position correction based on the information obtained by the above-described reflected-wave detection operation. This results in the correction of the misalignment between power transmission antenna 203 and power reception antenna 204. The state in which the misalignment has been corrected is shown in FIG. 3. In the normal state with no misalignment shown in FIG. 3, the strong electromagnetic wave radiated from first and second power transmission antenna elements 301 and 302 in the front direction does not return as a reflected wave. As a result, position-detection power reception antennas 401 detect small electric power. This allows control circuit 406 to recognize the absence of misalignment. When recognizing the absence of misalignment, control circuit 406 terminates the misalignment correction operation. Control circuit 406 then allows antenna switch 402 to switch all antenna elements of power transmission antenna 203 including first and second power transmission antenna elements 301 and 302 and the antenna elements used as position-detection power reception antennas 401 to power transmission antenna elements. More specifically, all antenna elements of power transmission antenna 203 are connected to microwave generator 201 and allowed to function as power transmission antenna elements for transmitting an electromagnetic wave (microwave). FIG. 4 shows a state of wireless power transmission in which power transmission by an electromagnetic wave (microwave) is started using all power transmission antenna elements of power transmission antenna 203.

As described above, according to the method for wireless power supply including the reflected-wave detection operation, it is possible to recognize misalignment in a direction parallel to the power transmission surface of power transmission antenna 203 and the power reception surface of power reception antenna 204. Correcting this misalignment achieves efficient power transmission as a result of the correct positioning.

In the misalignment correction operation, only some of the power transmission antenna elements of power transmission antenna 203 are used for positioning. Thus, the method and system for wireless power supply according to the exemplary embodiment requires only small transmission power for position detection and has high safety.

Figure 5:
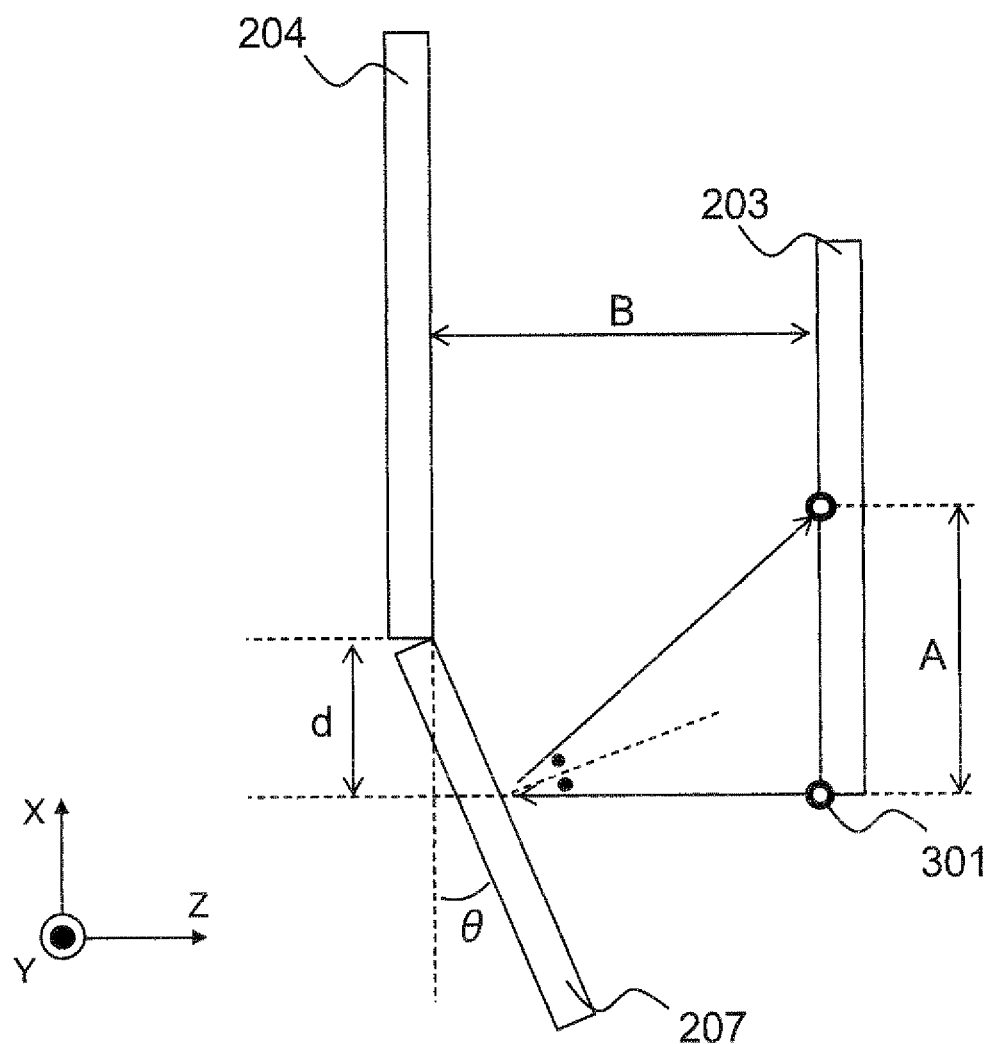
FIG. 5 shows the position where a reflected wave reaches in the configuration of the exemplary embodiment of the present invention.

In the method for wireless power supply according to the exemplary embodiment, at the time of position detection, first and second power transmission antenna elements 301 and 302 of power transmission antenna 203 are sequentially powered. In other words, the antenna elements of the position-detection power transmission antennas are powered one by one, thereby detecting the direction of misalignment. It is alternatively possible to transmit power concurrently to first and second power transmission antenna elements 301 and 302, which are the position-detection power transmission antennas. In that case, the direction and amount of misalignment can be detected from the position where the power of the reflected wave is detected and the amount of the power in each antenna element of position-detection power reception antennas 401. The detection method will now be described with reference to FIG. 5. FIG. 5 shows a state in which power transmission antenna 203 is misaligned in the −X-axis direction by a distance d with respect to power reception antenna 204, in a plane parallel to the power transmission surface of power transmission antenna 203 and the power reception surface of power reception antenna 204.

In the state shown in FIG. 5, the electromagnetic wave (microwave) radiated from first power transmission antenna element 301 in the front direction is reflected by reflector 207 disposed at an angle θ with respect to the power reception surface, and reaches a position away by a distance A from first power transmission antenna element 301. In that case, the distance A can be calculated from the relation shown in a formula (1) below.

$$A=(B-d \tan \theta)\tan 2\theta \quad (1)$$

Figure 6:
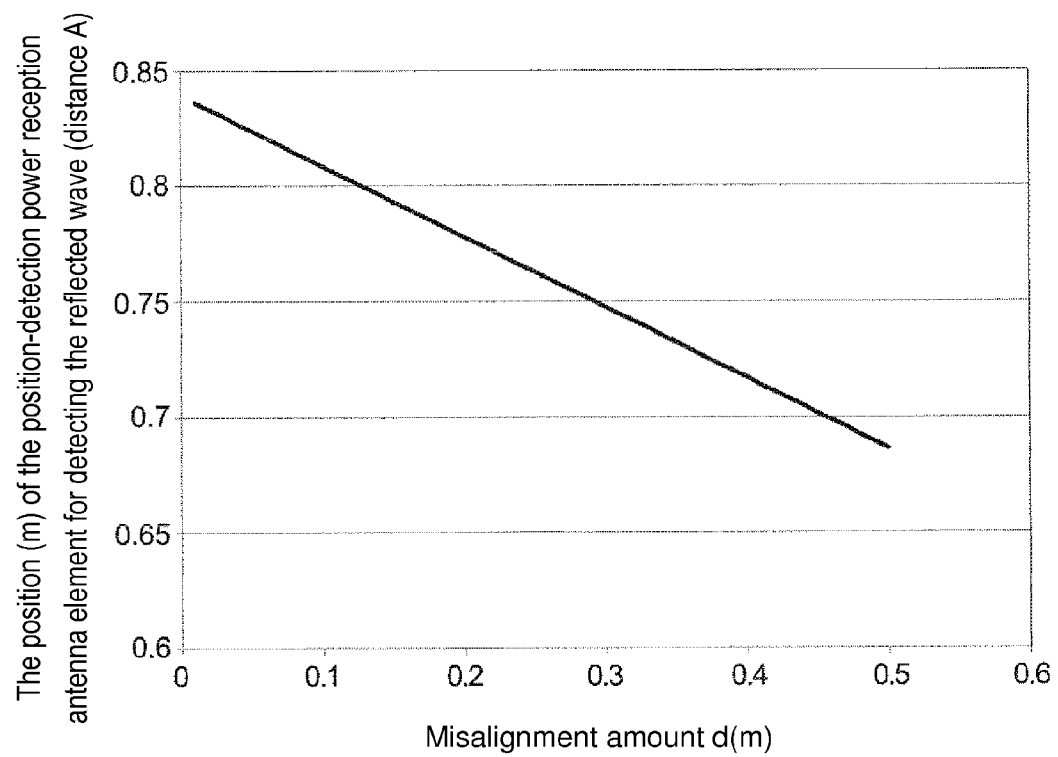
FIG. 6 shows the relation between a degree of misalignment and a distance from a power transmission antenna element to a power reception antenna element in the configuration of the exemplary embodiment of the present invention.

According to the above formula (1), the relation between the misalignment d of reflector 207 and the position of the power reception antenna element that receives the strongest reflected wave can be obtained as shown in the graph of FIG. 6. In the formula (1), B represents a distance between power transmission antenna 203 and power reception antenna 204, and θ represents an inclination angle of reflector 207. The above-mentioned position of the power reception antenna element corresponds to the distance A from the position-detection power transmission antenna element to the position-detection power reception antenna element.

The graph of FIG. 6 shows the results of the calculation of the formula (1), where B=1 m, and θ=20°. The misalignment direction and the misalignment amount d can be calculated by comparing the power intensity of each element of position-detection power reception antennas 401 based on the relation shown in the formula (1). Power transmission antenna 203 and power reception antenna 204 shown in FIG. 5 are identical in configuration, and their power transmission surface and power reception surface are parallel and opposite to each other. First power transmission antenna element 301 of power transmission antenna 203 shown in FIG. 5 is disposed nearly at the edge of the power transmission surface.

Figure 7:
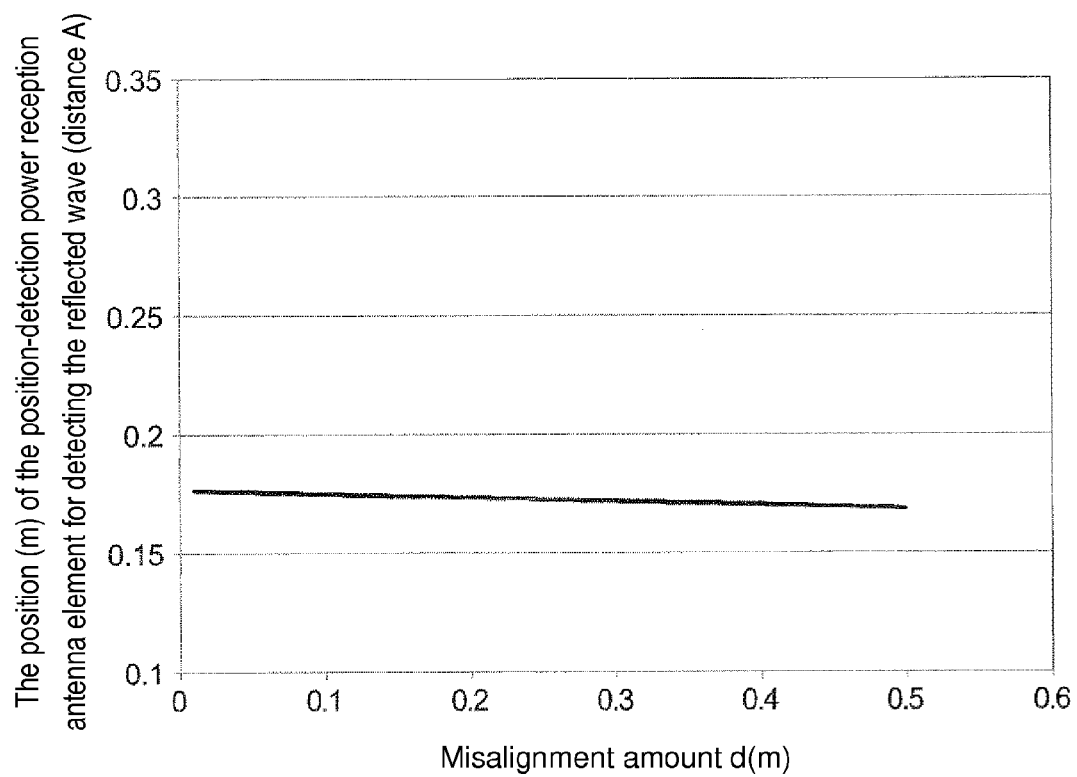
FIG. 7 shows the relation between a degree of misalignment and a distance from a power transmission antenna element to a power reception antenna element in another configuration of the exemplary embodiment of the present invention.

FIG. 7 shows the calculation results of the relation between the misalignment amount d and the position of the position-detection power reception antenna element that receives the reflected wave (the distance A) under the condition of B=1 m and θ=5° in the positional relation shown in FIG. 5. In the case shown in FIG. 7, the position of the position-detection power reception antenna element that receives strong power (the distance A) hardly changes regardless of the misalignment amount d. As a result, only a specific antenna element disposed away by the distance A from first power transmission antenna element 301 can be used as a position-detection power reception antenna. In other words, this position-detection power reception antenna receives a strong reflected wave regardless of the misalignment amount d. This results in a reduction in the number of antenna elements used as the position-detection power reception antennas. As a result, antenna elements that are used as position-detection power reception antennas can be used as fixed antenna elements for power reception without switching between transmission and reception in power transmission antenna 203.

Figure 8:
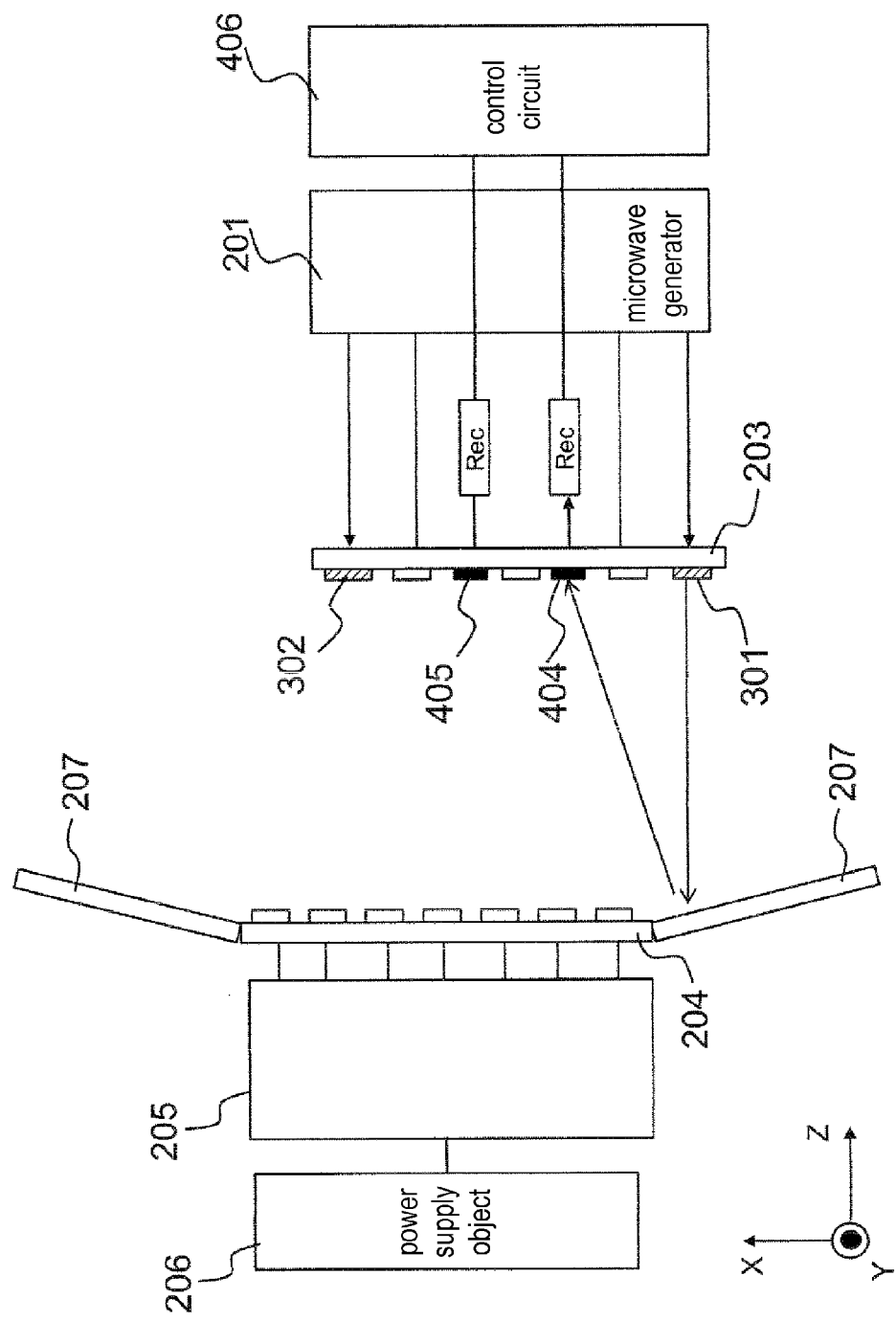
FIG. 8 is a diagram in which a system for wireless power supply according to further another configuration of the exemplary embodiment of the present invention has misalignment when using fixed antenna elements for power reception.
Figure 9:
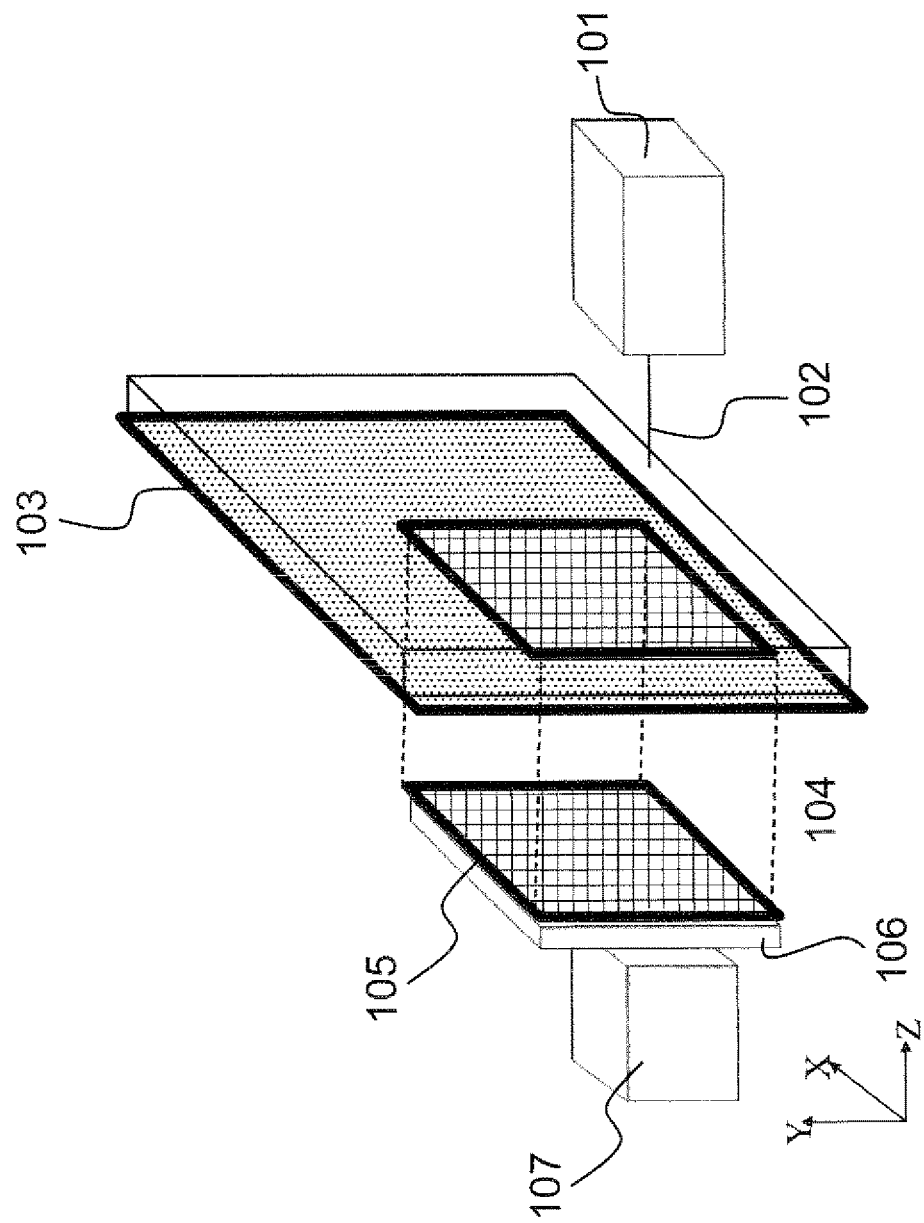
FIG. 9 shows a conventional method for wireless power supply.

FIG. 8 is a diagram in which some of the antenna elements of power transmission antenna 203 are used as fixed antenna elements for power reception. In FIG. 8, a misalignment correction operation is being performed, where the reflected wave from first power transmission antenna element 301 is received by first fixed antenna element 404 for power reception, and the reflected wave from second power transmission antenna element 302 is received by second fixed antenna element 405 for power reception. As described above, assume, for example, that the distance between the power transmission surface of power transmission antenna 203 and the power reception surface of power reception antenna 204 is short (e.g., not less than 0.1 m and not more than 1 m), and that the angle θ of reflector 207 with respect to the power reception surface is more than 0° and not more than 5°, for example, B=1 m and θ=5°. In that case, fixed antenna elements for power reception are previously disposed at predetermined positions of power transmission antenna 203, so that there is no need to provide an antenna switch on the power transmission side.

The present exemplary embodiment describes misalignment in the X-axis direction using a Z-X plane view, but misalignment in the Y-axis direction can be described in the same manner using a Y-Z plane view. Thus, the method for microwave power supply according to the present invention is applicable to solving misalignment in a direction parallel to the power transmission/reception surfaces of the transmission/reception antennas.

As described above, the method for wireless power supply according to an exemplary embodiment of the present invention is a method in which power is supplied wirelessly from power transmission antenna 203 including a plurality of power transmission antenna elements to power reception antenna 204 including a plurality of power reception antenna elements. The power transmission surface of power transmission antenna 203 and the power reception surface of power reception antenna 204 are parallel and opposite to each other, and reflector 207 is provided outside the power reception surface and inwardly inclined at a predetermined angle with respect to the power reception surface. This method for wireless power supply includes a misalignment correction operation prior to a wireless power supply operation performed as follows.

Among the plurality of power transmission antenna elements, at least two antenna elements disposed at the periphery of the power transmission surface of power transmission antenna 203 are allowed to function as position-detection power transmission antennas 301 and 302, and antenna elements disposed inside the position-detection power transmission antennas 301 and 302 on the power transmission surface are allowed to function as position-detection power reception antennas 401 (or 404 and 405). Next, an electromagnetic wave is radiated from the position-detection power transmission antennas 301 and 302 to the power reception antenna 204. Next, the electric power of the electromagnetic wave reflected by reflector 207 and then received by position-detection power reception antennas 401 is calculated. Next, the positional relation between power transmission antenna 203 and power reception antenna 204 is detected based on the calculated electric power. Next, the relative position between power transmission antenna 203 and power reception antenna 204 is corrected based on the detected positional relation.

This method for wireless power supply causes no such problems as efficiency degradation due to misalignment or electromagnetic wave leakage, and achieves the position recognition of a mobile object by using no additional component other that power transmission antenna 203 and power reception antenna 204.

According to this method for wireless power supply, reflector 207 may be disposed at an inclination angle of more than 0° and less than 45° with respect to the power reception surface of power reception antenna 204.

According to this method for wireless power supply, in the misalignment correction operation, when the misalignment correction operation is over, position-detection power reception antennas 401 may be switched to the power transmission antenna elements.

According to this method for wireless power supply, in the misalignment correction operation, misalignment is detected with respect to a predetermined direction in a plane parallel to the power reception surface of power reception antenna 204 and the power transmission surface of power transmission antenna 203. To achieve this, each of position-detection power transmission antennas 301 and 302 may be disposed at a predetermined position on the periphery of the power transmission surface, respectively. Each of position-detection power transmission antennas 301 and 302 may be turned on one by one for power transmission. Position-detection power reception antennas 401 may receive the electromagnetic wave radiated from position-detection power transmission antennas 301 and 302 and reflected by reflector 207. The direction of the misalignment may be determined and the misalignment in the determined direction may be corrected based on the electric power thus detected by position-detection power reception antennas 401.

According to this method for wireless power supply, the distance between the power transmission surface of power transmission antenna 203 and the power reception surface of power reception antenna 204 may be not less than 0.1 m nor more than 1 m, the predetermined angle of reflector 207 with respect to the power reception surface may be more than 0° and not more than 5°, and position-detection power reception antennas 404 and 405 may maintain function even in the wireless power supply operation.

The system for wireless power supply according to the exemplary embodiment of the present invention is a system in which power is supplied wirelessly from a power transmission apparatus to a power reception apparatus. The power transmission apparatus includes microwave generator 201 configured to generate an electromagnetic wave, control unit 208 configured to control microwave generator 201, and power transmission antenna 203 having a power transmission surface including a plurality of power transmission antenna elements. The power reception apparatus, on the other hand, includes power reception antenna 204, reflector 207, and power conversion circuit 205. The power reception antenna 204 has a power reception surface including a plurality of power reception antenna elements. The power reception surface is parallel and opposite to the power transmission surface. Reflector 207 is provided outside the power reception surface and has a reflective surface inclined at a predetermined angle with respect to the power reception surface so as to face inward. Power conversion circuit 205 converts the power received by power reception antenna 204 into power to be supplied to power supply object 206. In the misalignment correction operation performed before the wireless power supply operation, among the plurality of power transmission antenna elements, at least two antenna elements disposed at the periphery of the power transmission surface of power transmission antenna 203 function as position-detection power transmission antennas 301 and 302, and antenna elements disposed inside position-detection power transmission antennas 301 and 302 on the power transmission surface function as position-detection power reception antennas 401 (or 404 and 405). Control unit 208 detects the positional relation between power transmission antenna 203 and power reception antenna 204 based on the electric power of an electromagnetic wave radiated from position-detection power transmission antennas 301 and 302, reflected by reflector 207, and received by position-detection power reception antennas 401.

This system for wireless power supply causes no such problems as efficiency degradation due to misalignment or electromagnetic wave leakage, and achieves the position recognition of a mobile object by using components of power transmission antenna 203 and power reception antenna 204.

According to this system for wireless power supply, control unit 208 may include antenna switch 402, power reception circuit 403, and control circuit 406. Antenna switch 402 may allow the antenna elements, disposed inside position-detection power transmission antennas 301 and 302, among the plurality of antenna elements of power transmission antenna 203 to function as position-detection power reception antennas 401. Power reception circuit 403 may convert the power received by position-detection power reception antennas 401. Control circuit 406 may control antenna switch 402. In the misalignment correction operation performed before the wireless power supply operation, control circuit 406 may control antenna switch 402 so that the at least two of the plurality of antenna elements of power transmission antenna 203 can function as position-detection power transmission antennas 301 and 302. Control circuit 406 may then detect the positional relation between power transmission antenna 203 and power reception antenna 204 based on the electric power of the electromagnetic wave radiated from position-detection power transmission antennas 301 and 302, reflected by reflector 207, and received by position-detection power reception antennas 401.

According to this system for wireless power supply, reflector 207 may be disposed at an inclination angle of more than 0° and less than 45° with respect to the power reception surface of power reception antenna 204.

According to this system for wireless power supply, control unit 208 may allow position-detection power reception antennas 401 to be switched to the power transmission antenna elements when the misalignment correction operation is over.

According to this system for wireless power supply, the power transmission apparatus and/or the power reception apparatus may be moved to a predetermined position based on the information about the detected positional relation between power transmission antenna 203 and power reception antenna 204 so that the power transmission surface of power transmission antenna 203 and the power reception surface of power reception antenna 204 can face each other.

As described above, the method and system for wireless power supply according to the present invention can detect the misalignment between the power transmission antenna and the power reception antenna by using specific antenna elements on the power transmission antenna, without using a separate device dedicated to positioning. Thus, this method and system capable of supplying electric power wirelessly to mobile objects is very useful and versatile.

What is claimed is:

1. A method for wireless power supply in which power is supplied wirelessly from a power transmission antenna to a power reception antenna, the power transmission antenna including a plurality of power transmission antenna elements, and the power reception antenna including a plurality of power reception antenna elements
   wherein
   a power transmission surface of the power transmission antenna and a power reception surface of the power reception antenna are parallel and opposite to each other, and
   a reflector is provided outside the power reception surface and inwardly inclined at a predetermined angle with respect to the power reception surface,
   wherein the method includes a misalignment correction operation prior to a wireless power supply operation, and
   during the misalignment correction operation, the method comprises:
   allowing at least two, of the plurality of power transmission antenna elements, disposed at periphery of the power transmission surface of the power transmission antenna to function as position-detection power transmission antennas, and allowing antenna elements, of the plurality of power transmission antenna elements, disposed inside the position-detection power transmission antennas on the power transmission surface to function as position-detection power reception antennas;
   radiating an electromagnetic wave from the position-detection power transmission antennas to the power reception antenna;
   calculating electric power of the electromagnetic wave reflected by the reflector and then received by the position-detection power reception antennas;
   detecting a positional relation between the power transmission antenna and the power reception antenna based on the calculated electric power; and
   correcting a relative position between the power transmission antenna and the power reception antenna based on the detected positional relation.

2. The method of claim 1, wherein the reflector is disposed at an inclination angle of more than 0° and less than 45° with respect to the power reception surface of the power reception antenna.

3. The method of claim 1, wherein
   when the misalignment correction operation is over, the position-detection power reception antennas are switched to the power transmission antenna elements.

4. The method of claim 1, wherein
   in the misalignment correction operation, each antenna element of the position-detection power transmission antennas is disposed at a predetermined position on the periphery of the power transmission surface so that misalignment can be detected with respect to a predetermined direction in a plane parallel to the power reception surface of the power reception antenna and the power transmission surface of the power transmission antenna, and
   each antenna element of the position-detection power transmission antennas is switched one by one for power transmission, so that a direction of the misalignment is determined and the misalignment in the determined direction is corrected based on the electric power detected by the position-detection power reception antennas that have received the electromagnetic wave radiated from the position-detection power transmission antennas and reflected by the reflector.

5. The method of claim 1, wherein
a distance between the power transmission surface of the power transmission antenna and the power reception surface of the power reception antenna is in a range from 0.1 m to 1 m, inclusive,
the predetermined angle of the reflector with respect to the power reception surface is more than 0° and not more than 5°, and
the position-detection power reception antennas maintain function even in the wireless power supply operation.

6. A system for wireless power supply in which power is supplied wirelessly from a power transmission apparatus to a power reception apparatus,
wherein
the power transmission apparatus includes:
a microwave generator configured to generate an electromagnetic wave;
a control unit configured to control the microwave generator; and
a power transmission antenna having a power transmission surface including a plurality of power transmission antenna elements, and
the power reception apparatus includes:
a power reception antenna having a power reception surface including a plurality of power reception antenna elements, the power reception surface being parallel and opposite to the power transmission surface;
a reflector provided outside the power reception surface and having a reflective surface inclined at a predetermined angle with respect to the power reception surface so as to face inward; and
a power conversion circuit configured to convert the power received by the power reception antenna into power to be supplied to a power supply object,
wherein
in a misalignment correction operation performed before a wireless power supply operation, at least two, of the plurality of power transmission antenna elements, disposed at periphery of the power transmission surface of the power transmission antenna function as position-detection power transmission antennas, and antenna elements, of the plurality of power transmission antenna elements, disposed inside the position-detection power transmission antennas on the power transmission surface function as position-detection power reception antennas, and
the control unit is configured to detect a positional relation between the power transmission antenna and the power reception antenna based on electric power of an electromagnetic wave radiated from the position-detection power transmission antennas, reflected by the reflector, and received by the position-detection power reception antennas.

7. The system of claim 6, wherein the control unit includes:
an antenna switch configured to allow the antenna elements, of the plurality of power transmission antenna elements of the power transmission antenna, disposed inside the position-detection power transmission antennas to function as the position-detection power reception antennas;
a power reception circuit configured to convert the power received by the position-detection power reception antennas into power required to detect misalignment; and
a control circuit configured to control the antenna switch,
wherein in the misalignment correction operation performed before the wireless power supply operation, the control circuit is configured to control the antenna switch so that the at least two of the plurality of power transmission antenna elements of the power transmission antenna function as the position-detection power transmission antennas, and detect the positional relation between the power transmission antenna and the power reception antenna based on the electric power of the electromagnetic wave radiated from the position-detection power transmission antennas, reflected by the reflector, and received by the position-detection power reception antennas.

8. The system of claim 6, wherein the reflector is disposed at an inclination angle of more than 0° and less than 45° with respect to the power reception surface of the power reception antenna.

9. The system of claim 6, wherein the control unit switches the position-detection power reception antennas to the power transmission antenna elements when the misalignment correction operation is over.

10. The system of claim 6, wherein at least one of the power transmission apparatus and the power reception apparatus is moved to a predetermined position based on information about the detected positional relation between the power transmission antenna and the power reception antenna so that the power transmission surface of the power transmission antenna and the power reception surface of the power reception antenna can face each other.

* * * * *